Feb. 10, 1970  MATEUSZ KASIMIERZ BIELEC  3,494,680
THRUST BEARING ASSEMBLIES

Filed Jan. 24, 1968  3 Sheets-Sheet 1

INVENTOR
MATEUSZ KAZIMIERZ BIELEC
BY
Pierce, Scheffler & Parker
ATTORNEYS

Feb. 10, 1970   MATEUSZ KASIMIERZ BIELEC   3,494,680
THRUST BEARING ASSEMBLIES
Filed Jan. 24, 1968   3 Sheets-Sheet 2
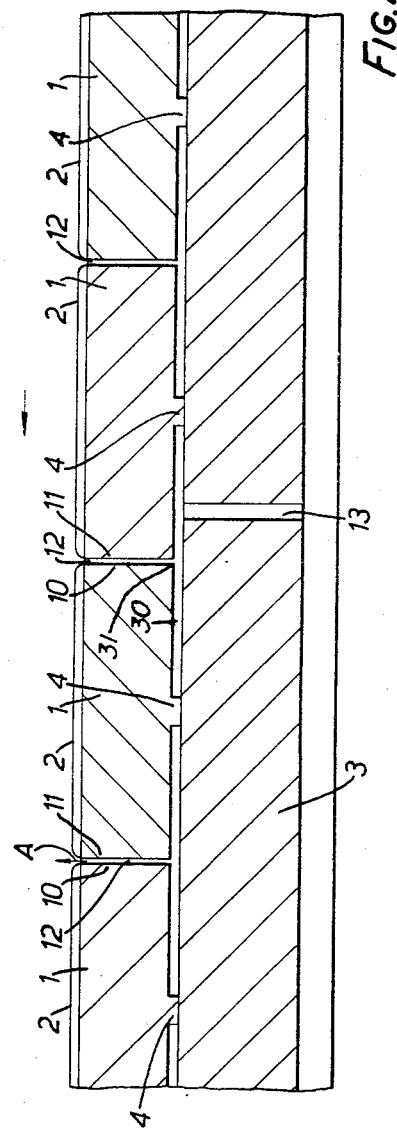
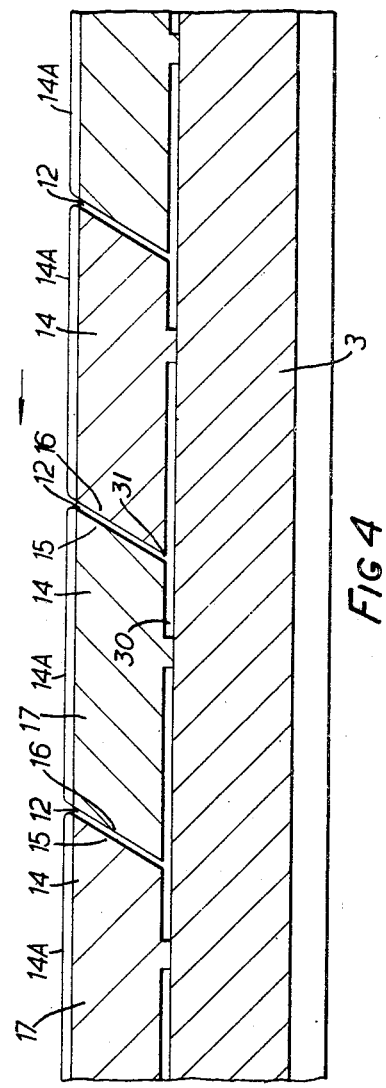
INVENTOR
MATEUSZ KAZIMIERZ BIELEC
BY
Pierce, Scheffler & Parker
ATTORNEYS Feb. 10, 1970   MATEUSZ KASIMIERZ BIELEC   3,494,680
THRUST BEARING ASSEMBLIES Filed Jan. 24, 1968

INVENTOR
MATEUSZ KAZIMIERZ BIELEC
BY
Pierce, Scheffler & Parker
ATTORNEY

United States Patent Office 3,494,680
Patented Feb. 10, 1970

3,494,680
THRUST BEARING ASSEMBLIES
Mateusz Kasimierz Bielec, London, England, assignor to The Glacier Metal Company Limited, Wembley, Middlesex, England
Filed Jan. 24, 1968, Ser. No. 700,245
Claims priority, application Great Britain, Jan. 26, 1967, 3,951/67
Int. Cl. F16c 17/06, 17/08
U.S. Cl. 308—160                        8 Claims

ABSTRACT OF THE DISCLOSURE

This is a multiple pad thrust bearing especially for operation at speeds so high that the losses would be very high if the bearing were immersed in an oil both.

Oil is fed under pressure through narrow passages between adjacent pads which prevent vortexes and air being entrained with oil.

---

This invention relates to thrust bearing assemblies. Some thrust bearing assemblies comprise an annular support, for example in the form of a carrier ring, carrying an annular series of separate circumferentially spaced thrust pads the faces of which remote from the support (hereinafter called the thrust faces) constitute the bearing surface against which in use bears a co-operating annular bearing surface on a rotary member, usually in the form of a collar, and referred to herein for convenience as a thrust collar, assumed to be rigid with a rotary shaft the axial thrust of which is to be transmitted to the support.

The invention is applicable both to thrust bearing assemblies in which the thrust pads are mounted on the support in such a manner that they can tilt during operation individually about one or more axes, and of the kind in which the thrust pads cannot tilt relatively to the support.

Such thrust bearing assemblies are known for example from the present applicants' British patent specifications Nos. 1,004,733, 1,032,743 and 1,017,664 while in addition the present applicants co-pending patent applications Nos. 37,103/64 and 42,951/66 relate to thrust bearing assemblies of the kind in question embodying lubrication systems in which the thrust surfaces are lubricated by liquid lubricant delivered in appropriate directions by lubricant ejection devices situated between adjacent thrust pads.

The present invention is concerned with the lubrication of thrust bearing assemblies of the general kind referred to and aims at providing a thrust bearing assembly of this kind which in relation to its dimensions will have high load-carrying capacity.

A thrust bearing assembly according to the present invention comprises a support carrying an annular series of circumferentially spaced thrust pads for co-operation with the plain annular thrust surface of a thrust collar, wherein the thrust pads are formed and disposed to define a gap between the adjacent sides of each adjacent pair of thrust pads constituting a narrow passage for the flow of pressurised liquid lubricant (hereinafter for convenience called lubricating oil) to the bearing surfaces of the pads, and including a lubricant supply passage communicating with the end of the narrow passages adjacent to the support.

The flow along the narrow passages will be in a direction having a substantial component parallel to the axis of rotation of the thrust collar during operation.

The lubricating oil is thus delivered under pressure through each of the narrow passages in question towards and onto the part of the annular thrust surface of the collar which at any moment lies opposite the narrow exit of the narrow passage lying between the adjacent edges of the thrust faces on an adjacent pair of pads.

In one preferred construction according to the invention the thrust pads are located within an annular recess formed in the support, the arrangement being such that the inner and outer circumferential walls of the recess serve to restrict or substantially prevent escape of lubricating oil respectively in the inward and outward radial directions from the narrow passages formed by the gaps between the pads. Thus each of the narrow passages referred to has in effect a narrow rectangular cross-section the two relatively wide opposite walls of the passage being formed respectively by the sides of the two adjacent pads while the other two (relatively narrow) opposite walls are formed respectively by the inner and outer circumferential walls of the annular recess in the support in which the pads lie.

Moreover, in order further to restrict the escape of oil, seals may be provided to prevent escape of oil radially outwards and/or inwards from the spaces between the pads.

In thrust bearing assemblies of the general kind to which the invention relates employing known lubrication methods the pads are separated circumferentially from one another by substantial gaps and, with such lubricating system it has been found that there is a tendency for the lubricating oil to form vortices in the gaps and thus entrap so much air that inadequate lubrication results. With the present invention on the other hand not only does the narrowness of the gaps between adjacent pads tend to prevent formation of such vortices but both the formation of vortices, and the entrapping of air if they do form to any extent, tends to be prevented both by reason of the fact that the lubricating oil is delivered under pressure and the fact that the lubricating oil in the gap between each adjacent pair of pads is being continuously renewed.

It will be understood that the appropriate width for each of the gaps between adjacent pads will be determined by the lubricating oil pressure available, the other dimensional characteristics of the assembly and possibly by the speed and/or load range to be provided for, but in all cases will be considerably narrower than in constructions of the kind disclosed for example in the present applicant's British specification No. 1,017,664.

Thus the width of the narrow passage might be expected to lie in the range 0.2–0.01 of the radial width of the pad. For a small pad 0.5" wide, the smaller end of the range gives a passage width of 0.005" whereas for a large pad about 1 ft. wide, the larger end of the range gives a passage width of about 2½".

The pads might be in the range 0.3"–4" thick and the lubricant pressure in the range 10–1000 lbs. per square inch.

In a typical case with a lubricant pressure of 500 lbs. per square inch, the load bearing capacity might be about 2000 lbs. per square inch.

It will usually be convenient to supply the lubricating oil from a single pressurised oil supply passage, via a number of distributing passages to appropriate points on the annular support.

In any case the sides of adjacent pads which constitute two opposite sides of each narrow passage may lie in parallel planes which are normal to the mean plane in which the thrust faces of the pads lie in use or in parallel planes which are inclined to such mean plane in such a direction that the direction of flow of lubricant through each passage has a circumferential component in the opposite direction from that of the movement, when in operation, of the adjacent part of the co-operating thrust surface of the thrust collar.

In many cases it will be preferred to construct and arrange each pad so that it can tilt relatively to the support, as for example by providing on the face of each pad which lies adjacent to the support a part acting as a thrust transmitting fulcrum while in any case it will be understood that means will be provided for preventing rotation of the pads relatively to the support.

Alternatively, or in addition to such a part acting as a fulcrum each pad may be provided with radial pivots projecting from or into its inner and/or outer circumferential sides in a radial direction or in a direction tangential to a circle having the axis of rotation of the thrust collar for centre so that these pivots not only permit tilting of the pads but maintain them correctly spaced from one another and prevent rotation of the pads relative to the support. Such a construction may be particularly convenient where the pads lie in an annular recess as described above since in this case the pivots can extend into or from the inner or outer circumferential walls of the recess.

According to another feature of the invention which, may be employed in thrust bearing assemblies of the general kind referred to whether employing the particular lubricating system referred to above or some other form of lubricating system, the pads are mounted on the support in a manner enabling them to tilt relatively to the support about one or more axes, means are provided for preventing unintentional detachment of the pads from the support, and spacing means between the adjacent sides of each pair of adjacent pads are provided comprising at least one screw-threaded spacing member engaging a screw-thread in the side of one of such pair of adjacent sides and bearing on the adjacent side of the other of such pair of adjacent sides, thus enabling the spacing of the various pads from one another to be adjusted. In such an arrangement each spacing member may be in the form of a screw-threaded bolt engaging a screw-threaded bore in the side of one pad and having a part-spherical or like head which engages the adjacent side of the other pad, thus facilitating relative tilting between the pads.

One construction, and certain modifications thereof, according to the invention are shown by way of example in the accompanying drawings, in which:

FIGURE 2 is a developed section through the assembly shown in FIGURE 1 along the arc B—B;

FIGURE 4 is a cross-section similar to FIGURE 2 of a modified construction according to the invention;

Figure 1:
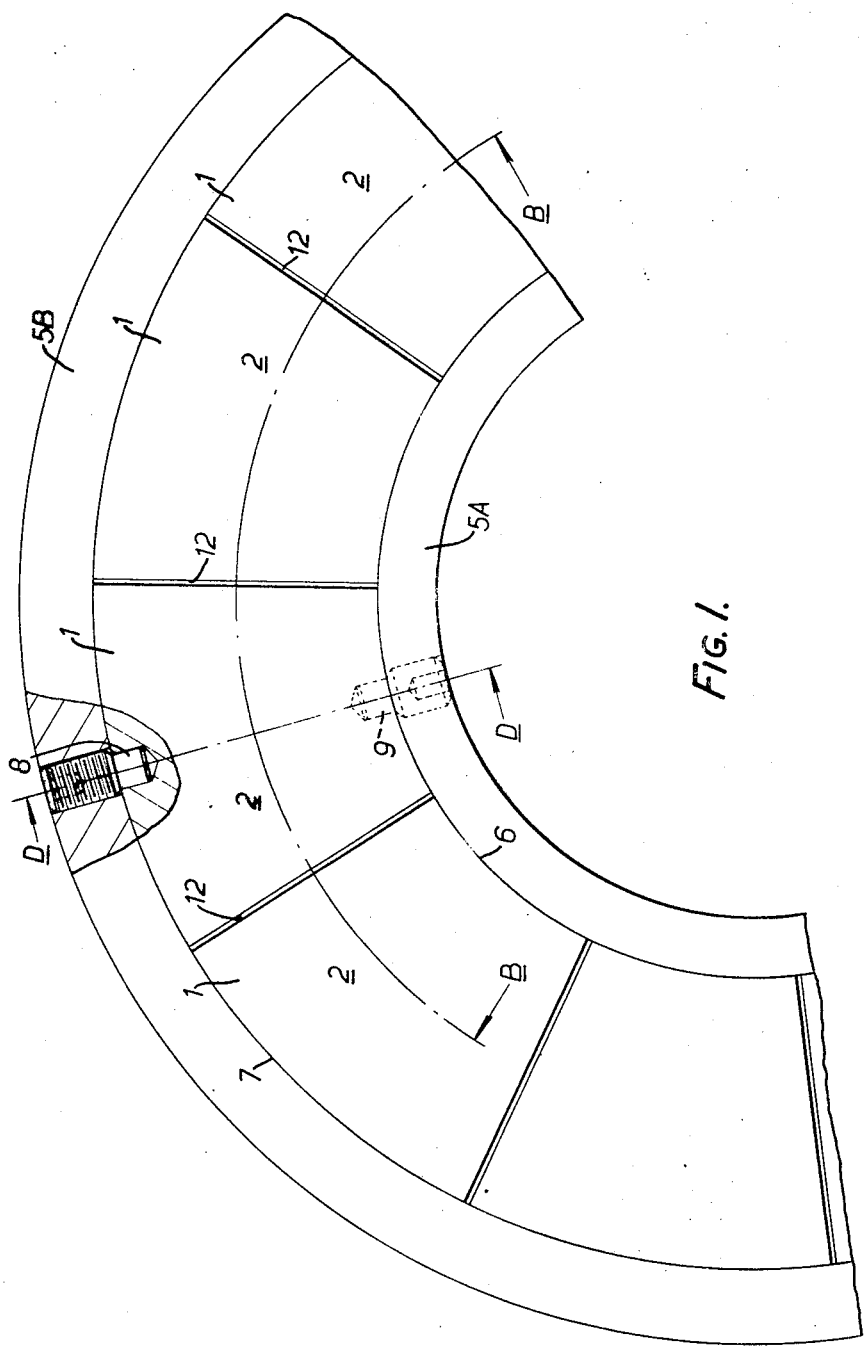
FIGURE 1 is a front elevation of part of a thrust bearing assembly according to the invention.
Figure 3:
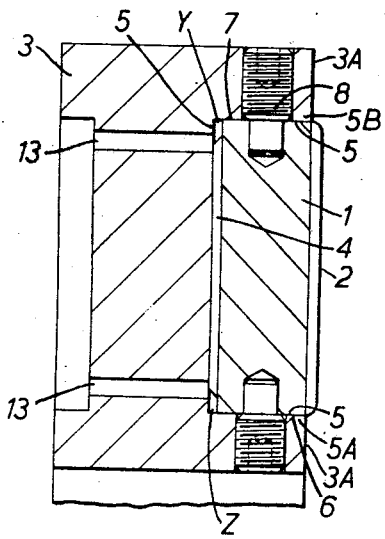
FIGURE 3 is a cross-section through the assembly shown in FIGURE 1 on the line D—D.

In the construction shown in FIGURES 1, 2 and 3 the assembly comprises a series of pads 1, having thrust faces 2, supported on and capable of rocking relative to a carrier ring 3 to which they transmit thrust through radial ribs 4 which thus constitute fulcra permitting individual tilting movement of the pads relatively to the support. As shown most clearly in FIGURE 3, the pads 1 are located in an annular recess 5 in the face of the carrier ring 3, preferably with only sufficient clearance between the inner and outer circumferential surfaces 6 and 7 of the pads and inner and outer circumferential walls 5A, 5B of the recess 5 to permit the necessary tilting movement of the pads. The thrust face 2 of each pad lies in a plane which is displaced from the plane of the adjacent face 3A of the carrier ring 3 only sufficiently to allow for the necessary mechanical clearance between the thrust face of the thrust collar to be employed with the assembly and the adjacent face 3A of the carrier ring, while allowing for such tilting of the pads as may occur during operation.

In some cases each pad 1 may be pivotally connected to the circumferential walls 5A and 5B of the annular recess 5 as by means of pivots indicated at 8 or 9 in FIGURE 1 and at 8 in FIGURE 3 such pivots permitting the tilting of each pad while holding the pads in correct spaced relation to one another and from rotation in the annular recess about the axis of rotation of the thrust collar. Alternatively other means may be provided for spacing the pads circumferentailly from one another and/or preventing rotation of the pads in the annular recess.

In any event the dimensions and arrangement will be such that there is provided between the adjacent sides 10 and 11 of each adjacent pair of pads a narrow passage 12. Lubricating oil is forced under pressure from ducts 13 in the support 3, into the chamber 30 at the back of each thrust pad and thence via the exit 31 from the chamber to the end of the each passage 12 adjacent to the base of the recess 5 and out from the end of the passage 12 which opens between the thrust faces 2 of the adjacent pair of pads 1, as shown most clearly in FIGURE 2 by the arrow A.

It will be apparent that the escape of oil radially inwards and outwards from the passages 12 will be restricted or substantially prevented by the walls 5A and 5B of the annular recess 5, while flow of oil other than between the adjacent thrust faces of the adjacent pair of pads may further be restricted or prevented by annular seals at the points indicated at Y and Z in FIGURE 3. In some cases these seals Y and Z may serve to locate the pads against displacement in the recess. Oil which does escape radially will be drained away for recirculation.

In FIGURE 4 the construction is similar to that described above with reference to FIGURES 1, 2 and 3 and similar parts have been given the same reference numerals and will not again be described. In FIGURE 4, however, as will be seen, the pads, which are designated by the reference numeral 14, have adjacent parallel sides 15, 16 which lie in planes inclined to rather than perpendicular to the plane of the thrust faces 14A of the pads, the appropriate direction of rotation of the thrust collar in this arrangement being as indicated by the arrow E in FIGURE 4.

It will be apparent that with constructions according to the invention, for example as described above with reference to FIGURES 1, 2, 3 or FIGURE 4 of the drawings it is possible without requiring expensive additional oil supply arrangements to "jack" the thrust bearing assembly automatically before starting the machinery with which it is associated, that is to say it is possible by delivering lubricating oil under pressure to the appropriate supply duct or ducts (e.g. 13) to provide the assembly as a whole with a layer of lubricant under static pressure between its thrust surfaces prior to its being brought into operation.

Figure 5A:
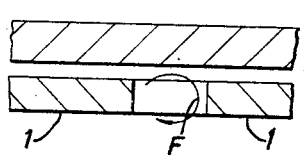
FIGURES 5A and 5B are diagrams showing how the formation of oil vortices tends to be prevented by the invention.
Figure 5B:
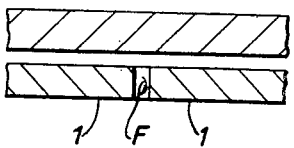

FIGURE 5A shows diagrammatically a pair of adjacent thrust pads 1 with their adjacent sides widely spaced and indicates by the arrow F how readily an oil vortex can form in this space, while FIGURE 5B indicates the condition where the two adjacent pads have only a narrow gap between them, as in the constructions described above according to the invention, when it will be seen that a vortex cannot readily form between the adjacent sides of the pads while moreover, since there will be a continuous flow of oil to the space in question from the back of the pads through the narrow passage formed by the gap between the pads, the formation of such a vortex will be further resisted and, since the oil will be under pressure, the tendency for air to be entrapped should a vortex tend to form will also be resisted. The arrow A in FIGURE 2 indicates the direction of flow of the oil through the narrow passage between one pair of adjacent pads, it being understood that similar flow takes place through the narrow passage between each pair of adjacent pads in the constructions according to the invention described above.

Figure 6:
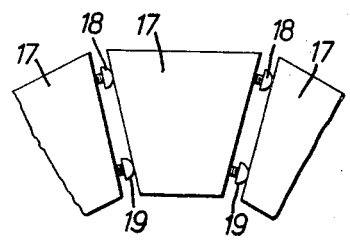
FIGURE 6 is an elevation of part of a pad assembly which may be employed in thrust bearing assemblies according to the invention.

In the construction shown in FIGURE 6, which is generally applicable to tilting pad thrust bearings, each pad 17 is to be assumed to be mounted so that it can tilt about one or more axes relatively to the support carrying it while being held from rotation relatively to that support. The pads are widely spaced compared with the constructions above described and the spacing of adjacent pads is effected and controlled by adjustable screw-thread members 18, 19 the screw-threaded shank of each of which engages a screw-thread bore in one of the pair of adjacent pads between which it lies while its part-spherical head engages the adjacent side of the other of the pair of pads. It will be understood that appropriate locking means will be provided to retain each of the members 18, 19 in any determined position of adjustment.

That type of spacer can give quite close spacing between pads, but pivots and narrow gaps of FIGURES 1-5 allow a maximum of the annular area to be available as bearing surface, since little space is lost between pads.

It is to be noted that the bearings, the subject of the invention do not operate with the bearing members running in a bath of oil. At the high speeds of up to 400 feet per second at which they may be operated, oil in such a bath would involve substantial losses in churning and viscous drag.

What I claim as my invention and desire to secure by Letters Patent is:

1. A thrust bearing assembly comprising a support carrying an annular series of circumferentially spaced thrust pads for cooperation with a plain annular thrust surface of a thrust collar, said thrust pads being formed and so disposed as to define a gap between the adjacent sides of each adjacent pair of thrust pads constituting a narrow passage for the flow of a pressurized liquid lubricant to the bearing surfaces of said thrust pads, an annular inner and an annular outer seal respectively between the radially inner and radially outer parts of said thrust pads and said support, a sealed lubricant chamber defined between and bounded by the backs of said thrust pads and the surface of said support and said seals, a lubricant supply duct communicating with said chamber, and exit means from said chamber leading to said narrow passages.

2. An assembly as claimed in claim 1 in which the pads are in an annular recess forming the support which recess is closely spaced from the pads at the radial inner and radial outer sides of the narrow passages.

3. An assembly as claimed in claim 2 in which the bearing surface of the pads stands outwardly from the surface of a member defining the circumferential walls of the recess.

4. An assembly as claimed in claim 1 in which the sides of adjacent pads which constitute sides of each narrow passage lie in planes normal to the bearing surface.

5. An assembly as claimed in claim 1 in which the opposite sides of each narrow passage are inclined to the plane of the bearing surface in such a direction that the direction of flow of lubricant through the passage has a circumferential component.

6. A thrust bearing assembly as defined in claim 1 and including means for maintaining adjacent thrust pads in their circumferentially spaced relation, said spacing means comprising at least one screw-threaded spacing member engaging a screw-thread in the side of one of each pair of adjacent sides and bearing on the adjacent side of the other.

7. A thrust bearing assembly as defined in claim 1 and which includes means arranging said thrust pads for a tilting movement relative to said support.

8. A thrust bearing assembly as defined in claim 7 wherein said means arranging said thrust pads for a tilting movement relative to said support include a radial pivot on each said thrust pad which functions as a fulcrum and locates the pad.

References Cited

UNITED STATES PATENTS

| | | | |
|---|---|---|---|
| 2,268,770 | 1/1942 | Orshansky | 308—73 |
| 3,291,543 | 12/1966 | Nigh | 308—160 |
| 2,168,345 | 8/1939 | Kingsburg | 308—160 |

FOREIGN PATENTS

| | | |
|---|---|---|
| 187,497 | 10/1922 | Great Britain. |
| 605,095 | 2/1926 | France. |

MARTIN P. SCHWADRON, Primary Examiner

FRANK SUSKO, Assistant Examiner